United States Patent
Kirtley et al.

(10) Patent No.: US 11,478,003 B2
(45) Date of Patent: *Oct. 25, 2022

(54) PROCESS FOR PRODUCING A LIQUID POTATO PRODUCT

(71) Applicant: McCain Foods Limited, New Brunswick (CA)

(72) Inventors: Nigel Kirtley, Glencoe, IL (US); Ray Laudano, Libertyville, IL (US); Derek E. Spors, Boulder, CO (US); Lora Nicolette Spizzirri, Inverness, IL (US)

(73) Assignee: McCain Foods Limited, New Brunswick (CA)

( * ) Notice: Subject to any disclaimer, the term of this patent is extended or adjusted under 35 U.S.C. 154(b) by 8 days.

This patent is subject to a terminal disclaimer.

(21) Appl. No.: 16/894,116

(22) Filed: Jun. 5, 2020

(65) Prior Publication Data
US 2020/0383362 A1 Dec. 10, 2020

Related U.S. Application Data

(60) Provisional application No. 62/859,542, filed on Jun. 10, 2019.

(51) Int. Cl.
*A23L 19/12* (2016.01)
*A23L 19/00* (2016.01)
(Continued)

(52) U.S. Cl.
CPC ............. *A23L 19/12* (2016.08); *A23L 5/13* (2016.08); *A23L 5/30* (2016.08); *A23L 19/09* (2016.08); *A23L 19/13* (2016.08); *A23V 2002/00* (2013.01)

(58) Field of Classification Search
CPC ........ A23L 19/10; A23L 19/105; A23L 19/12; A23L 19/13; A23L 19/19; A23L 5/13; A23L 5/15; A23L 5/30; A23L 19/09
(Continued)

(56) References Cited

U.S. PATENT DOCUMENTS 2,798,815 A * 7/1957 Medriczky .............. A23L 19/13
426/464
3,063,849 A * 11/1962 Nelson .................... A23L 19/15
426/267
(Continued)

FOREIGN PATENT DOCUMENTS

AU 2013270528 A1 6/2015
AU 2014200598 A1 8/2015
(Continued)

OTHER PUBLICATIONS

Missreen Abu-Ghannam et al., The effect of low temperature blanching on the texture of whole processed new potatoes, Elsevier Journal of Food Engineering, Department of Food Science and Environmenta Health, Dublin Institute of Technology, Cathal Brugha St., Dublin 1, Ireland, Sep. 6, 2004, 10 pages.
(Continued)

*Primary Examiner* — Drew E Becker
*Assistant Examiner* — Austin Parker Taylor
(74) *Attorney, Agent, or Firm* — Hovey Williams LLP; Kameron D. Kelly

(57) ABSTRACT

A liquid potato-derived product may be produced from whole raw potatoes and may be utilized to produce various healthy food products, such as dips and sauces. This liquid potato product may be produced from raw potatoes by pretreating the potatoes, gelatinizing the pretreated potatoes, shearing the gelatinized potatoes under specific milling temperatures and conditions to produce a sheared potato product with desirable particle sizes, and then cooking the sheared potato product to form the liquid potato product.

19 Claims, 4 Drawing Sheets

(51) Int. Cl.
*A23L 5/30* (2016.01)
*A23L 5/10* (2016.01)

(58) Field of Classification Search
USPC .................................. 426/550, 637
See application file for complete search history.

(56) References Cited

U.S. PATENT DOCUMENTS

| | | | |
|---|---|---|---|
| 3,109,739 A | 11/1963 | Hilton | |
| 4,160,849 A | 7/1979 | Huchette et al. | |
| 4,528,202 A * | 7/1985 | Wang | A23L 19/13 426/550 |
| 5,061,507 A * | 10/1991 | Aulik | A23J 3/26 426/637 |
| 5,425,308 A * | 6/1995 | Dickerson | A23N 15/00 134/63 |
| 6,251,465 B1 | 6/2001 | Bello et al. | |
| 6,485,775 B1 * | 11/2002 | Camin | A23G 9/34 426/573 |
| 6,706,298 B1 | 3/2004 | Villagran et al. | |
| 6,808,734 B2 | 10/2004 | Villagran | |
| 7,026,006 B1 * | 4/2006 | McArthur | A23L 19/13 426/464 |
| 7,820,223 B2 | 10/2010 | Bhaskar et al. | |
| 8,282,978 B1 | 10/2012 | Jensen et al. | |
| 8,304,011 B1 | 11/2012 | McArthur et al. | |
| 8,632,835 B2 | 1/2014 | Joseph et al. | |
| 8,877,278 B2 | 11/2014 | Joseph et al. | |
| 8,940,346 B1 | 1/2015 | Pan et al. | |
| 9,723,851 B2 | 8/2017 | Pan et al. | |
| 2002/0189607 A1 | 12/2002 | Lavoie et al. | |
| 2006/0188638 A1 | 8/2006 | Joseph et al. | |
| 2006/0188639 A1 | 8/2006 | Joseph et al. | |
| 2007/0098875 A1 | 5/2007 | Howard et al. | |
| 2010/0080868 A1 * | 4/2010 | Crosby | A23L 19/13 426/52 |
| 2011/0076380 A1 | 3/2011 | Dyhin | |
| 2013/0045315 A1 * | 2/2013 | Succar | A23L 2/02 426/519 |
| 2019/0037904 A1 | 2/2019 | Daly et al. | |

FOREIGN PATENT DOCUMENTS

| | | |
|---|---|---|
| AU | 2014200757 A1 | 9/2015 |
| CN | 107549536 A | 1/2018 |
| EP | 2249664 A1 | 11/2010 |
| GB | 978818 A | 6/1963 |
| WO | 01/35763 A1 | 5/2001 |
| WO | 02/07535 A2 | 1/2002 |
| WO | WO-0207535 A2 * | 1/2002 ............ A23L 19/13 |
| WO | 2009/080860 A1 | 7/2009 |

OTHER PUBLICATIONS

Maria Dolores Alvarez et al., Rheological behavior of fresh and frozen potato puree in steady and dynamic shear at different temperatures, Euroopean Food Research and Technology, May 2004, DOI: 10.1007/s00217-004-0897-2, 11 pages.
Search Report and Written Opinion dated Aug. 18, 2020 for related PCT Patent Application No. PCT/IB2020/055390, filed Jun. 9, 2020, 9 pages.
Great Britain Combined Search and Examination Report dated Dec. 1, 2020 for related Great Britain Patent Application No. GB2008777.1, 5 pages.
Search Report and Written Opinion dated Aug. 21, 2020 for related PCT Patent Application No. PCT/IB2020/055391, 7 pages.
Great Britain Examination Report dated Aug. 23, 2021 for related Great Britain Patent Application No. GB2008777.1 4 pages.
Yang et al., Composition, structure and physicochemical properties of three coloured potato starches, Key laboratory of Agricultural products processing engineering of Anhui Province, Anhui Agricultural University, 130 Chang Jian West Road, Hefei 230036, China, Apr. 26, 2018, International Journal of Food Science and Technology 2018; 11 pages.

* cited by examiner

PROCESS FOR PRODUCING A LIQUID POTATO PRODUCT

RELATED APPLICATIONS

This application claims the priority benefit under 35 U.S.C. § 119(e) of U.S. Provisional Patent Application Ser. No. 62/859,542 entitled "LIQUIFIED POTATO PRODUCT AND PROCESS," filed Jun. 10, 2019, the entire disclosure of which is incorporated herein by reference.

BACKGROUND

1. Field of the Invention

The present invention is generally related to potato-based products that may be used to produce various food products. More generally, the present application is generally related to the production of liquid and semi-solid potato products that may be used to produce various healthy food products.

2. Description of the Related Art

There has been an increasing emphasis on the production of healthy food products primarily derived from vegetables and other organic plant-based products. For instance, various food manufacturers have produced dips, sauces, and other food products using nuts or cauliflower as the base component. However, these existing food products may exhibit one or more deficiencies, such as poor taste, inadequate texture, allergy risks, high production costs, and overall unhealthy formulations. Thus, there still is a need to identify and efficiently produce a healthy food product from plant-based sources.

SUMMARY

One or more embodiments generally concern a method for making a liquid potato product. Generally, the method comprises: (a) providing an initial potato feed comprising a potato component; (b) shearing at least a portion of the initial potato feed at a temperature of less than 67° C. to thereby form a sheared potato product comprising an average particle size on a volume basis in the range of 50 to 300 μm as measured by a Microtrac Bluewave Particle Size Analyser; and (c) heating the sheared potato product to at least 55° C. to thereby form the liquid potato product.

One or more embodiments generally concern a method for making a food product. Generally, the method comprises: (a) providing an initial potato feed comprising a potato component having an initial moisture content; (b) at least partially gelatinizing the initial potato feed to thereby form a gelatinous potato feed; (c) shearing at least a portion of the gelatinous potato feed at a temperature of less than 67° C. to thereby form a sheared potato product comprising an average particle size on a volume basis in the range of 50 to 300 μm as measured by a Microtrac Bluewave Particle Size Analyser; and (d) heating the sheared potato product to at least 55° C. to thereby form a liquid potato product.

One or more embodiments generally concern a liquid potato product for producing a food product. Generally, the liquid potato product comprises: an average particle size in the range of 50 to 300 μm as measured by a Microtrac Bluewave Particle Size Analyser and exhibits two or more of the following rheological properties as measured at 12.5° C.:
  i. $Y_{1-5} \neq Y_{5-10} \neq Y_{10-15} \neq Y_{15-20}$;
  ii. $Y_5$ is at least 50 percent greater than $Y_1$;
  iii. $Y_{1-5}$ is at least 50 percent greater than $Y_{5-10}$, $Y_{10-15}$, and/or $Y_{15-20}$; and
  iv. $Y_{5-10}$ is at least 50 percent greater than $Y_{10-15}$ and/or $Y_{15-20}$;

Furthermore, "Y" refers to shear stress in dynes per centimeter squared (dynes/cm$^2$) and subscript values used with "Y" are shear rates or shear rate ranges per second (1/s) at which the shear stress "Y" is measured. Additionally, the rheological properties are measured 30 minutes after forming the liquid potato product.

BRIEF DESCRIPTION OF THE FIGURES

Embodiments of the present invention are described herein with reference to the following drawing figures, wherein.

DETAILED DESCRIPTION

Figure 1:
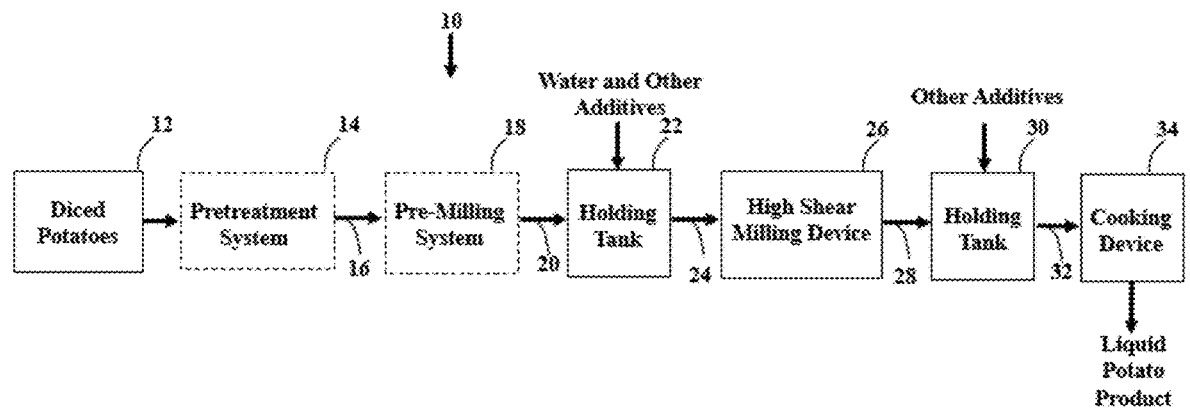
FIG. 1 depicts an exemplary Liquid P production system that may be employed to at least partially convert one or more potato-containing feeds into Liquid P and food products containing Liquid P.

The present invention is generally related to the production of Liquid P, which is a liquid product at least partially derived from potatoes, and the use of Liquid P to produce various food products. Certain embodiments of the present invention may include a potato liquefaction system for converting potatoes and other root vegetables into a useful liquid product, such as Liquid P. As discussed below in greater detail, it has been observed that the system described herein is capable of creating a unique liquid potato product, i.e., Liquid P, which can be used to produce various types of food products that exhibit one or more desirable traits.

As used herein, the term "Liquid P" may be used interchangeably with "liquid potato product" and both refer to a substance containing at least 5 weight percent potato and having a dynamic viscosity in the range of 70 to 250,000 cP at a shear rate of 4 1/s and at a temperature in the range of 12.5° C. to 95° C.

As discussed below in greater detail, a method of making the liquid potato product, i.e., Liquid P, is provided herein.

Generally, the production method utilizes an initial potato feed comprising a raw diced or cubed potato component. This potato feed may be optionally pretreated by blanching to thereby eliminate any enzyme activity and at least partially gelatinize the potato feed. Furthermore, in various embodiments, the initial potato feed may also be chemically treated using chelating agents to eliminate the possibility of subsequent non-enzymic browning. However, for the production process described herein, it may not be necessary to blanch, pre-gelatinize, and/or chelate the initial potato feed.

Furthermore, in various embodiments, the initial potato feed may then be mixed with water, and in some cases at least one oil, in a defined ratio. This potato, water, and optional oil mixture may be pre-milled at a temperature of around 1 to 40° C. so as to produce a coarse slurry wherein the potato pieces, and the oil when present, are easily maintained in suspension through stirring. Typically, if the potato pieces are small enough in the initial potato feed, the pre-milling step may be skipped and omitted from the process. Alternatively, in various embodiments, if the process is carried out in a batch basis, then there may be no need to maintain the potato pieces in suspension as all material enters the next step together.

The potato mixture comprising potato, water, and optional oil may then be processed in a high shear milling device, such as an Urschel Comitrol or a Tetra Laval 250 High Pressure Homogenizer, where the pieces of potato are broken down into finer particle sizes, generally in the range of 1.5 to 500 µm, as measured by a Microtrac Bluewave Particle Size Analyser.

An advantage of using the high shear milling devices described herein is that each element of the potato mixture may pass through the high shear region only once and for a relatively short time. This may result in a very efficient application of mechanical energy for comminuting, which may cause a very low temperature rise (typically only a few degrees centigrade) in the sheared product. With this cold milling process, it is possible to maintain the milling temperature well below the gelatinization temperature of potato starch, which is believed to begin at 55° C. and be completed at 67° C. Consequently, the resulting milled product does not automatically thicken upon being milled.

As used herein, the terms "milling" and "shearing" may be used interchangeably and both terms refer to a mechanical treatment that induces a shear rate through the liquid which changes the underlying micro-structure. Thus, for example, shearing and milling may include particle comminution.

Once the potato mixture has been milled, it can then be mixed with other ingredients, such as tomato pieces, spices, beans, root vegetables, etc., and then heated to a point wherein the potato starch will thicken. Generally, this may occur once the starch gelatinization temperature (i.e., above 67° C.) is reached.

FIG. 1 depicts an exemplary Liquid P production system 10 that may be employed to at least partially convert one or more potato-containing feeds into Liquid P and food products containing Liquid P. It should be understood that the Liquid P production system 10 shown in FIG. 1 is just one example of a system within which the present invention can be embodied. Thus, the present invention may find application in a wide variety of other systems where it is desirable to efficiently and effectively produce liquid potato products. As described below, the system 10 depicted in FIG. 1 may be used to carry out the Cold Milling Liquid Potato (CMLP) process. The exemplary system 10 illustrated in FIG. 1 will now be described in greater detail.

Turning to FIG. 1, an initial potato feed 12 may be provided to the system. Generally, in various embodiments, the initial potato feed 12 may comprise diced potatoes that have been diced into pieces having average widths of at least 0.1, 0.15, 0.2, or 0.25 inches and/or less than 0.75, 0.6, or 0.5 inches. Furthermore, in various embodiments, the diced potatoes in the initial potato feed 12 may be peeled and/or unpeeled.

In various embodiments, the potato feed 12 can comprise, consist essentially of, or consist of potatoes. Generally, in various embodiments, the potatoes can comprise of any variety of *Solanum tuberosum*. Exemplary potato varieties can include, for example, Shepody potatoes, Bintje potatoes, American Blue potatoes, Royal potatoes, Innate Potatoes, Maris Piper potatoes, Focus potatoes, Yukon Gold potatoes, Lady Balfour potatoes, Kennebec potatoes, Colette potatoes, Chieftain potatoes, Innovator potatoes, Russet Burbank potatoes, purple potatoes, Russet potatoes, Bamberg potatoes, or combinations thereof.

Although the following description is based on the use of potatoes (i.e., *Solanum tuberosum*) as the principal component in the potato feed 12, it is envisioned that potatoes may be replaced partially or entirely with other forms of starchy, tuberous roots, such as sweet potatoes (i.e., *Ipomoea batatas*). Thus, in any of the following embodiments, it is envisioned that the potato component may be formed from sweet potatoes (i.e., *Ipomoea batatas*) as opposed to potatoes (i.e., *Solanum tuberosum*).

In various embodiments, the potato feed 12 can comprise at least 25, 50, 75, 80, 85, 90, 95, or 99 weight percent of one or more potatoes, based on the total weight of the feed stream.

The potatoes in the initial potato feed 12 may come from any conventional potato source. For example, the potato source can be, for example, a hopper, storage bin, railcar, trailer, or any other device that may hold or store potatoes and other types of vegetables.

In certain embodiments, the initial potato feed 12 may comprise one or more other root vegetables, such as parsnips, celery root, sweet potatoes, onions, red beets, carrots, or combinations thereof. As used herein, the term "root vegetable" refers to an edible underground plant part, other than potatoes, that comprises a higher fiber content relative to peeled potatoes.

In various embodiments, the potato feed 12 can comprise at least 1, 5, 10, 15, 20, or 25 weight percent and/or less than 90, 85, 80, 75, 70, 65, 60, 55, 50, 45, 40, 35, or 30 weight percent of one or more root vegetables, based on the total weight of the potato feed.

Turning again to FIG. 1, the potato feed 12 can be sent to an optional pretreatment system 14 for further processing before any subsequent milling and cooking steps. While in the pretreatment unit 14, the potato feed 12 can go undergo one or more treatments including, for example, washing, peeling, mashing, water bath, microwave heating, radio frequency heating, magnetic heating, electric field pulse heating, cubing, dicing, or combinations thereof.

While in the optional pretreatment sysem 14, the potato feed 12 can undergo any known process or technique for at least partially gelatinizing at least a portion of the potatoes in the potato feed. In various embodiments, the optional pretreatment sysem 14 can comprise any system or device capable of subjecting the potato feed 14 to a blanching and/or gelatinization process, such as a microwave, a hot water bath, autoclave, or any other device known in the art.

Generally, the blanching and gelatinization process can involve any heat treatment capable of at least partially gelatinizing the potatoes in the potato feed 12. Such techniques may include, for example, microwaving, boiling, scalding, blanching, or combinations thereof.

It should be noted that, in various embodiments, the gelatinization process does not involve a mashing step. Thus, in such embodiments, the gelatinized potato feed would not be considered "mashed."

Generally, in various embodiments, the blanching process can involve: (i) contacting the potato feed 12 with hot water and/or steam and (ii) subsequently contacting the heated potato feed with an aqueous solution to thereby form the gelatinized feed 22. In certain embodiments, the aqueous solution can comprise one or more chelating agents and/or pH-modifying agents, such as citric acid, EDTA, sodium acid pyrophosphate, a phosphate compound, or a combination thereof.

In certain embodiments, the first step of the blanching process can comprise contacting the potato feed 12 with heated water over a time period of at least 1, 2, 3, 4, or 5 minutes and/or less than 30, 25, 20, 15, or 10 minutes. In such embodiments, this water heat treatment can occur at around atmospheric pressures and at a temperature of at least 50° C., 55° C., 60° C., 65° C., 70° C., 75° C., or 80° C. Additionally or alternatively, in various embodiments, the water heat treatment can occur at a temperature of less than 150° C., 125° C., 100° C., 95° C., 90° C., 85° C., 80° C., 75° C., 70° C., 65° C., 60° C., or 55° C.

In certain embodiments, the first step of the blanching process can comprise contacting the potato feed 12 with pressurized steam over a time period of at least 1, 2, 3, 4, or 5 minutes and/or less than 30, 25, 20, 15, or 10 minutes. In such embodiments, this steam treatment can occur at a gauge pressure of at least 10, 25, 50, 75, 100, or 125 psig and/or less than 300, 250, 200, 175, or 160 psig and at temperature of at least 100° C., 125° C., or 150° C. and/or less than 300° C., 250° C., 200° C., or 185° C.

In certain embodiments, the second step of the blanching process can occur at a temperature of at least 10° C., 15° C., 20° C., 25° C., 30° C., 35° C., 40° C., 45° C., 50° C., 55° C., 60° C., 65° C., 70° C., 75° C., or 80° C. and/or less than 150° C., 125° C., 100° C., 95° C., 90° C., 85° C., 80° C., 75° C., 70° C., 65° C., or 60° C. Additionally or alternatively, in various embodiments, the second step of the blanching process can occur over a time period of less than 10, 5, 4, 3, 2, or 1 minutes.

In certain embodiments, the blanching process will remove very little water and/or solids from the potato feed 12. Unlike prior art blanching techniques that partially dehydrate the potato feeds, the blanching techniques of the present disclosure may attempt to retain much of the water, moisture, and solids naturally present in the potatoes. For example, in various embodiments, the moisture content (by weight) of the at least partially gelatinized potato feed 16 may be less than 50, 45, 40, 35, 30, 25, 20, 15, 10, 9, 8, 7, 6, 5, 4, or 3 percent lower than the moisture content of the potato feed 12. In other words, the moisture content of the gelatinized potato feed 16 may be at least 50, 55, 60, 65, 70, 75, 80, 85, 90, 91, 92, 93, 94, 95, 96, or 97 percent of the moisture content of the potato feed 12.

Consequently, the potato feed 12 can be pretreated in the pretreatment sysem 14 in a variety of ways so to improve the characteristics of the potato feed. As noted above, this may include a blanching step. Depending on the time and temperature, the blanching conditions may at least partially gelatinize the starch in the potatoes as well as denature any enzymes. From an economic perspective, it may be desirable to subject the potato feed 12 to minimal blanching as some blanching techniques can cause a loss of potato solids and, therefore, result in a reduced yield. Additionally, as discussed above, the pretreatment may also include submersion in an aqueous chelating solution (e.g., citric acid or sodium acid pyrophosphate) to prevent non-enzymic browning happening. Typically, the blanching and chelation conditions may be driven by the size of the incoming potato feed 12.

Alternatively, in various embodiments, any of the above-described pretreatment processes, or a pretreatment altogether, may be excluded as subsequent processing and/or other ingredients in the finished product may render such pretreatments unnecessary. It is also possible that the whole pretreatment process can be carried out totally separate from the rest of the process and the resulting pretreated potatoes 16 may be frozen and stored for later use. If this is the case, then the frozen pretreated potatoes may be thawed prior to being introduced into the pre-milling stage subsequent pre-milling system 18.

Upon leaving the optional pretreatment sysem 14, the pretreated potato feed 16 (or initial potato feed 12 if no pretreatment system is used) may be introduced into an optional pre-milling system 18. While in the pre-milling system 18, the pretreated potato feed 16 and/or the initial potato feed 12 can be pre-milled by a coarse cutting device, such as a bowl chopper (e.g., a Karl Schnell F-type blender) or fine dicing machine, at a temperature of around 1 to 40° C. The purpose of the pre-milling system 18 is to help produce a consistent slurry feed 20 prior to being fed into the high shear milling treatment 26. However, in certain embodiments, the pre-milling system 18 may be excluded if the potato feed is already of a sufficiently small size so as to make a slurry.

After pre-milling, the potato feed 20 may then be transferred to a mixing/holding tank 22 where water, at least one optional oil, and other ingredients can be added to the potato feed 20 prior to the high shear milling treatment. Additionally or alternatively, in various embodiments, water, at least one optional oil, and other ingredients may be added during the pre-milling step in the pre-milling system 18. In such embodiments, the mixing/holding tank 22 may be optional.

If an oil ingredient is added at either of these stages, then the oil droplet size may also be reduced during the subsequent high shear milling treatment and may be less prone to separation than if added after the high shear treatment. Exemplary oils can include, for example, vegetable oil, peanut oil, sunflower oil, canola oil, coconut oil, palm oil, corn oil, avocado oil, walnut oil, soybean oil, sesame oil, or combinations thereof. These oils and water can be useful in modifying the viscosity of the Liquid P and may also enhance certain taste and textural properties of the resulting Liquid P.

Exemplary other ingredients that may be added at this stage include, for example, root vegetables, optional flavorants, optional additives, and/or other types of vegetables (i.e., non-root vegetables) and/or fruits.

Exemplary flavorants can include, for example, spices, meat, cheese, herbs, or combinations thereof. Exemplary additives that may be added may include, for example, protein supplements (e.g., whey protein, chickpeas, soy, or combinations thereof), dietary fiber supplements, vitamins, minerals, or combinations thereof. The other vegetables and fruits that may be added at this stage can include, for example, *Capsicum* peppers (including sweet peppers and hot peppers), onions, spinach, kale, mushrooms, mango, artichokes, legumes, corn, olives, tomatoes, or combinations thereof.

Upon leaving the mixing/holding tank 22, at least a portion of the potato feed 24 can be introduced into a high shear milling device 26. While in the high shear milling device 26, the potato feed 24 can pass once through the high shear zone of the milling device where it is subjected to high lateral and rotational shear forces, which substantially reduce the particle size of the potato slurry 24 in a very efficient way. In various embodiments, although it will depend on the flowrate and power input into the high shear milling device 26, there is generally no appreciable temperature rise during the milling process. In such embodiments, the milling in the high shear milling device 26 may take place at a low enough temperature to avoid potato starch gelatinization, which is believed to begin at 55° C. and be complete at 67° C. Consequently, the resulting milled potato feed 28 may be very liquid-like and pumpable.

In various embodiments, the particle size of the milled potato feed 28 exiting the high shear milling device 26 may be in the range of 1.5 to 500 μm. For example, the milled potato feed 28 exiting the high shear milling device 26 may comprise an average particle size on a volume basis of at least 25, 30, 35, 40, 45, 50, 55, 60, 65, 70, or 75 μm and/or not more than 500, 400, 300, 290, 280, 270, 260, 250, 240, 230, 220, 210, 200, 190, 180, or 170 μm, as measured by a Microtrac Bluewave Particle Size Analyser.

In various embodiments, the sheared potato mixture may comprise a D10 particle size of at least 1, 2, 3, 4, or 5 μm and/or less than 100, 90, 80, 70, 60, 50, 40, 30, 20, or 10 μm, as measured by a Microtrac Bluewave Particle Size Analyser. As used herein, the "D10 particle size" indicates that 10 percent measured particles (on a volume basis) have a size not more than the recited size.

In various embodiments, the sheared potato mixture may comprise a D50 particle size of at least 25, 30, 35, 40, 45, 50, 55, 60, 65, 70, or 75 μm and/or less than 300, 290, 280, 270, 260, 250, 240, 230, 220, 210, 200, 190, 180, or 170 μm, as measured by a Microtrac Bluewave Particle Size Analyser. As used herein, the "D50 particle size" indicates that 50 percent the measured particles (on a volume basis) have a size not more than the recited size. For example, a D50 particle size range of 25 μm would indicate that 50 percent of the measured particles (on a volume basis) have a diameter not more than 25 μm. The D50 particle size may also refer to the median particle size within the measured particles.

In various embodiments, the sheared potato mixture may comprise a D90 particle size of at least 50, 55, 60, 65, 70, 75, 80, 85, 90, 95, 100, 110, 120, 130, 140, 150, 160, 170, 180, 190, 200, 210, or 220 μm and/or less than 300, 290, 280, or 270 μm, as measured by a Microtrac Bluewave Particle Size Analyser. As used herein, the "D90 particle size" indicates that 90 percent of the measured particles (on a volume basis) have a size not more than the recited size. For example, a D90 particle size range of 300 μm would indicate that 90 percent of the measured particles (on a volume basis) have a size not more than 300 μm.

The particle size ranges described herein may be determined using microscope imaging with a Lugol staining solution and/or a Microtrac Bluewave Particle Size Analyser (in Bluewave mode). A microscope image, such as those depicted in FIGS. 2 and 3, or a separate sample of the material may be analyzed by the Microtrac Bluewave Particle Size Analyser. The Microtrac Bluewave Particle Size Analyser uses laser diffraction to approximate equivalent sphere size distributions for the particles in the sample and thereby provides a particle size distribution range on a volume basis.

If the desired particle size can not be achieved in a single pass within the high shear milling device 26, it is possible for the milled potato steam 28 to be recycled back to the mixing/holding tank 22 for reprocessing through the high shear milling device 26 until the desired particle size is achieved.

The high shear milling device 26 can comprise any shearing device known in the art capable of providing the high shear necessary to produce the milled potato stream 28. Exemplary shearing devices can include, for example, an Urschel Comitrol or a Tetra Laval 250 High Pressure Homogenizer. Other generic types of high shear devices that may be used may include, for example, ball mills or hammer mills. Some high shear milling devices, such as the HPH, may require that the potato slurry 24 be pumpable. Thus, in such embodiments, water may be added to the pre-milled potato feed 24 to ensure that the potato feed is sufficiently pumpable. Alternatively, in various embodiments, other high shear milling devices, such as the Urschel Comitrol, the pre-milled potato feed 24 can be fed via gravity into the high shear milling device 26 through an inlet funnel and, therefore, does not need to be pumpable; rather, the feed just needs to be fluid enough to enter the milling chamber. In such embodiments, the addition of water may not be necessary at this stage due to the inherently high-water content in the potatoes.

In various embodiments, the shearing step in the high shear milling device 26 can occur at a temperature of at least 10° C., 15° C., 20° C., 25° C., 30° C., 35° C., 40° C., or 45° C. Additionally or alternatively, in various embodiments, the shearing step in the high shear milling device 26 can occur at a temperature of less than 67° C., 66° C., 65° C., 64° C., 63° C., 62° C., 61° C., 60° C., 59° C., 58° C., 57° C., 56° C., 55° C., 54° C., 53° C., 52° C., 51° C., or 50° C. It should be noted that these temperature ranges include and compensate for any heat produced by the shearing conditions.

In various embodiments, the shearing step in the high shear milling device 26 can occur over a time period of at least 0.1, 1, 2, 3, 4, 5, 6, 7, 8, 9, or 10 seconds and/or less than 500, 400, 360, 300, 240, 180, 120, 60, 55, 50, 45, 40, 35, 30, 25, 20, or 15 seconds. Thus, because the potato feed spends a relatively short time (seconds) in the high shear milling device 28, the CMLP process is considerable quicker than a hot milling process with a high shear mixer, which usually takes minutes.

Additionally or alternatively, in various embodiments, the shearing step in the high shear milling device 26 can occur at a pressure of at least 0, 1, 5, 10, or 14 psig and/or less than 4,000, 3,000, 2,000, 1,000, 900, 800, 700, 600, 500, 400, 300, 200, 100, 50, 25, 20, or 15 psig.

Turning again to FIG. 1, the resulting sheared potato feed 28 may be sent to a mixing/holding tank 30 where additional ingredients and additives may be added thereto. Exemplary other ingredients that may be added at this stage include, for example, root vegetables, optional flavorants, optional additives, and/or other types of vegetables (i.e., non-root vegetables) and/or fruits. It should be noted that other root vegetables may be added at this stage as long as such vegetables are of sufficiently small particle size (e.g., are finely chopped or in the form of a slurry).

The resulting sheared potato feed 28 may form a useful base material to which other ingredients may be added. The sheared potato feed 28 may be stored in the mixing/holding tank 30 for a length of time; although, from a processing and food safety perspective, it may not be practical to store the uncooked sheared potato feed 28 for an extended period of time. Generally, the sheared potato feed 28 has a low viscosity that is much easier to pump and mix compared to a potato feed that has already been gelatinized though a hot milling process (i.e., a milling process occurring at or above the starch gelatinization temperatures). Thus, the sheared potato feed 28 may be easier to transport relative to potato feeds treated via hot milling processes.

Afterwards, as shown in FIG. 1, the sheared potato feed 32 may be introduced into a cooking device 34, where it can be subjected to temperatures so as to increase the temperature of the potato feed to at least 55° C., 60° C., 65° C., 67° C., or 70° C. to thereby form the Liquid P. In various embodiments, it may be desirable to heat the sheared potato feed 32 to a temperature that will fully gelatinize the starch therein. It has been shown that at least 13 days can pass between the high shear milling treatment and the cooking step, where the starch is gelatinized, without any apparent adverse impact on the development texture in the Liquid P product. Although, from a processing and food safety perspective, it may not be practical to store uncooked sheared potato product for that length of time.

In various embodiments, the cooking step occurs at a temperature of at least 55° C., 60° C., 65° C., 70° C., or 75° C., and/or less than 300° C., 200° C., or 100° C. and at atmospheric pressure.

In certain embodiments, the final texture and rheological properties of the Liquid P may not develop until 24 hours after cooking and may continue to develop for up to several days thereafter. It has been observed that a low shear viscosity may develop over time along with a pronounced hysteresis (below a shear rate of 10 1/s), while high shear viscosity may decline.

The various characteristics and properties of the Liquid P are described below. It should be noted that, while all of the following characteristics and properties may be listed separately, it is envisioned that each of the following characteristics and/or properties of the Liquid P are not mutually exclusive and may be combined and present in any combination, as long as such combination does not conflict. It should be noted that all weight percentages associated with the Liquid P formulations are based on the total weight of the Liquid P formulation, unless otherwise noted.

In various embodiments, the Liquid P comprises at least 5, 10, 15, 20, 25, 30, 35, or 40 weight percent and/or less than 99, 95, 90, 85, 80, 75, 70, 65, 60, 55, or 50 weight percent of a potato component originally derived from the potatoes in the initial potato feed, based on the total weight of the Liquid P composition.

In various embodiments, the Liquid P can include up to 90 weight percent of one or more additional complex carbohydrate materials, other than potatoes. In certain embodiments, the additional complex carbohydrate materials used to make the Liquid P can have a higher fiber content than the potatoes used to make the Liquid P. Examples of additional complex carbohydrate materials suitable for use in Liquid P include root vegetables, such as parsnips, celery root, sweet potatoes, onions, red beets, carrots, or combinations thereof. For example, in various embodiments, the Liquid P comprises at least 1, 2, 5, 10, 15, or 20 weight percent and/or less than 60, 55, 50, 45, 40, 35, 30, 25, 20, 15, or 10 weight percent of one or more root vegetables originally present in the initial potato feed, based on the total weight of the Liquid P composition. In certain embodiments, the Liquid P comprises a weight ratio of potato to root vegetables of at least 0.1:1, 0.5:1, 1:1, 1.5:1, or 2:1 and/or less than 10:1, 9:1, 8:1, 7:1, 6:1, 5:1, 4:1, or 3:1.

In various embodiments, at least one oil is added in sufficient quantities so that the Liquid P comprises at least 1, 2, 3, 4, 5, 6, 7, 8, 9, or 10 weight percent and/or less than 75, 70, 65, 60, 55, 50, 45, 40, 35, 30, or 25 weight percent of the oil, based on the total weight of the Liquid P composition. In certain embodiments, the Liquid P comprises a weight ratio of potato to oil of at least 0.1:1, 0.5:1, 1:1, 2:1, 3:1, 4:1, 5:1, 6:1, or 7:1 and/or less than 100:1, 75:1, 50:1, 40:1, 30:1, or 20:1.

In various embodiments, water is added in sufficient quantities so that the Liquid P comprises at least 1, 2, 3, 4, 5, 6, 7, 8, 9, or 10 weight percent and/or less than 75, 70, 65, 60, 55, 50, 45, 40, 35, 30, or 25 weight percent of the added water, based on the total weight of the Liquid P composition. It should be noted that this added water refers to water added during the production of the Liquid P and does not encompass the moisture originally present in the potato.

In various embodiments, the flavorants, additives, other non-root vegetables, and/or fruits are added in sufficient quantities so that the Liquid P comprises at least 1, 2, 3, 4, 5, 6, 7, 8, 9, 10, 15, or 20 weight percent and/or less than 75, 70, 65, 60, 55, 50, 45, 40, 35, 30, or 25 weight percent of flavorants, additives, other non-root vegetables, and/or fruits, based on the total weight of the Liquid P composition. Alternatively, in certain embodiments, the Liquid P may not contain any added water, added oil, additives, and/or flavorants.

Due to the unique shearing process described herein, the Liquid P can be in the form of a viscous, flowable liquid that has a shiny and smooth appearance.

The Liquid P described herein can exhibit desirable rheological profiles without the need for thickening agents, such as starches, gums, flour, etc., which can be considered undesirable additives by many consumers. For example, the Liquid P may comprise less than 1, 0.5, 0.1, 0.05, or 0.01 weight percent of at least one thickening agent, based on the total weight of the Liquid P formulation.

It has been observed that the thickening effect of a cold-milled liquid potato product is different to a potato product made through either a conventional mashing process or a liquid potato product made through a hot milling process, particular in the lower shear region (i.e., below a shear rate of 10 1/s). It has also been observed that substantially less potato can be used to produce the cold-milled Liquid P described herein. Consequently, this has both economic as well as potentially nutritional (for those avoiding carbohydrates) advantages.

In various embodiments, the resulting Liquid P can exhibit a viscosity at 12.5° C. or 25° C. of at least 100, 250, 500, 1,000, 1,500, 2,000, 2,500, 3,000, 3,500, 4,000, 4,500, or 5,000 cP and/or less than 250,000, 200,000, 150,000, 100,000, 90,000, 80,000, 70,000, 60,000, 50,000, 40,000, 30,000, 25,000, or 20,000 cP.

Although not wishing to be bound by theory, it is believed that the shearing conditions used in the production of the Liquid P helps form its unique rheological profile. In one or more embodiments, the Liquid P is a non-Newtonian fluid having a non-linear relationship between shear stress and shear rate.

In various embodiments, the Liquid P may exhibit a shear stress at 12.5° C. of at least 5, 10, 15, 20, 25, 30, 35, 40, 45, 50, 75, 100, 125, 150, 175, 200, 225, 250, 275, 300, 325, 350, 375, 400, 425, or 450 dynes/cm$^2$ at a shear rate of 0, 5, 10, 15, or 20 per second ("1/s"). Additionally or alternatively, in various embodiments, the Liquid P may exhibit a shear stress at 12.5° C. of less than 900, 800, 700, 600, 500, 450, 400, 350, 300, 250, 200, 150, 125, 100, 75, or 50 dynes/cm$^2$ at a shear rate of 0, 5, 10, 15, or 20 1/s. It should be noted that these above rheological measurements may be applicable to the Liquid P immediately after its production (e.g., tested 30 minutes after its production) or after it has been stored for 24 hours ("Day 1"), 48 hours ("Day 2"), or 72 hours ("Day 3") at 6° C.

It has been observed that the presence of a complex carbohydrate material, such as fiber and other root vegetables, in the Liquid P formulation may influence the rheological properties of the composition. As used herein, a "complex carbohydrate material" comprises a higher complex carbohydrate content relative to peeled potatoes. As noted above, a complex carbohydrate material may include other root vegetables (i.e., root vegetables that are not potatoes). In various embodiments, the Liquid P can include up to 90 weight percent of one or more additional complex carbohydrates, other than potatoes.

In various embodiments, the Liquid P may exhibit one of the following shear stress profiles at 12.5° C. immediately after forming the Liquid P (e.g., 30 minutes after it has been formed) and/or after storing the Liquid P for 24 hours ("Day 1"), 48 hours ("Day 2"), or 72 hours ("Day 3") at 6° C.:
  i. a shear stress of at least 15, 20, 25, 30, 35, 40, 45, 50, 75, 100, 125, or 150 dynes/cm$^2$ at a shear rate of 5 1/s, a shear stress of at least 25, 30, 35, 40, 45, 50, 75, 100, 125, or 150 dynes/cm$^2$ at a shear rate of 10 1/s, a shear stress of at least 35, 40, 45, 50, 75, 100, 125, or 150 dynes/cm$^2$ at a shear rate of 15 1/s, and/or a shear stress of at least 40, 45, 50, 75, 100, 125, 150, 175, 200, 225, 250, 275, 300, 325, 350, 375, or 400 dynes/cm$^2$ at a shear rate of 20 1/s, when the Liquid P comprises no complex carbohydrate materials, such as other root vegetables and not including the potato component, or less than 10, 8, 6, 4, 2, or 1 weight percent of complex carbohydrate materials, such as other root vegetables and not including the potato component; or
  ii. a shear stress of at least 150, 175, 200, 225, or 250 dynes/cm$^2$ at a shear rate of 5 1/s, a shear stress of at least 200, 225, 250, 275, 300, 325, 350, 375, or 400 dynes/cm$^2$ at a shear rate of 10 1/s, a shear stress of at least 225, 250, 275, 300, 325, 350, 375, or 400 dynes/cm$^2$ at a shear rate of 15 1/s, and/or a shear stress of at least 250, 275, 300, 325, 350, 375, or 400 dynes/cm$^2$ at a shear rate of 20 1/s, when the Liquid P comprises at least 10, 12, 14, 16, 18, 20, or 25 weight percent of at least one complex carbohydrate material, such as other root vegetables and not including the potato component.

In various embodiments, the Liquid P may exhibit at least 1, 2, 3, 4, 5, or 6 of the following rheological properties:
  i. $Y_{1-5} \neq Y_{5-10} \neq Y_{10-15} \neq Y_{15-20}$;
  ii. $Y_5$ is at least 50, 100, 150, 200, 250, or 300 percent greater than $Y_1$;
  iii. $Y_{10}$ is at least 50, 100, 150, 200, 250, or 300 percent greater than $Y_{10-15}$ and/or $Y_{15-20}$;
  iv. $Y_{1-5}$ is at least 50, 100, 150, 200, 250, or 300 percent greater than $Y_{5-10}$, $Y_{10-15}$, and/or $Y_{15-20}$;
  v. $Y_{5-10}$ is at least 50, 100, 150, 200, 250, or 300 percent greater than $Y_{10-15}$ and/or $Y_{15-20}$;
  vi. $Y_{1-5}$ is greater than $Y_{10-20}$, $Y_{20-30}$, and/or $Y_{30-40}$; and/or
  vii. $Y_{1-10}$ is at least 25, 50, 75, 100, 125, or 150 percent greater than $Y_{10-20}$, $Y_{20-30}$, and/or $Y_{30-40}$.

As used herein, "Y" is shear stress in dynes per centimeter squared (dynes/cm$^2$) and subscript values used with "Y" are shear rates or shear rate ranges per second (1/s) at which the shear stress "Y" is measured. For example, "$Y_1$," "$Y_5$," "$Y_{10}$," "$Y_{15}$," "$Y_{20}$," "$Y_{30}$," and "$Y_{40}$" refer to the shear stress values (dynes/cm$^2$) of Liquid P at 12.5° C. at shear rates of 1, 5, 10, 15, 20, 30, and 40 1/s, respectively. Furthermore, as used herein, "$Y_{1-5}$," "$Y_{5-10}$," "$Y_{10-15}$," "$Y_{15-20}$," "$Y_{1-10}$," "$Y_{10-20}$," "$Y_{20-30}$," and $Y_{30-40}$" refer to the change in shear stress values between $Y_1$ and $Y_5$, $Y_5$ and $Y_{10}$, $Y_{10}$ and $Y_{15}$, $Y_{15}$ and $Y_{20}$, $Y_1$ and $Y_{10}$, $Y_{10}$ and $Y_{20}$, $Y_{20}$ and $Y_{30}$, and $Y_{30}$ and $Y_{40}$, respectively.

It should be noted that these above rheological measurements may be applicable to the Liquid P immediately after it has been produced (e.g., 30 minutes after it has been formed) or after it has been stored for 24 hours (Day 1), 48 hours (Day 2), or 72 hours (Day 3) at 6° C. Furthermore, the above rheological properties may be measured at 12.5° C.

When rheological property measurements and more than one storage criteria are claimed herein (e.g., "said rheological properties are either measured after storing said liquid potato product for 24 hours, 48 hours, or 72 hours at 6° C."), infringement of the claimed rheological properties may be met if an infringing product exhibits the recited rheological property at any one of the recited storage criteria (e.g., after storing for 24 hours at 6° C.). In other words, in order to determine infringement of the aforementioned hypothetical claim, rheological tests need to be conducted at each of the recited storage criteria (e.g., after storing for 24 hours at 6° C., after storing for 48 hours at 6° C., and after storing for 72 hours at 6° C.).

The resulting Liquid P can be used to produce various food products. Exemplary food products that the Liquid P can be used to produce include, for example, dips, sauces, dressings, soups, imitation dairy products, spreads, confectionaries, beverages, and any other food product incorporating liquid and/or semi-solid components. In certain embodiments, the food product comprises a dip.

In various embodiments, the food products produced with the Liquid P can comprise at least 1, 5, 10, 15, 20, 25, 30, 35, 40, 45, 50, 55, 60, 65, or 70 weight percent of the Liquid P, based on the total weight of the food product. Additionally or alternatively, in various embodiments, the food products produced with the Liquid P can comprise less than 99, 95, 90, 85, 80, 75, 70, 65, 60, 55, 50, 45, or 40 weight percent of the Liquid P, based on the total weight of the food product.

This invention can be further illustrated by the following examples of embodiments thereof, although it will be understood that these examples are included merely for the purposes of illustration and are not intended to limit the scope of the invention unless otherwise specifically indicated.

EXAMPLES

Four different processes for comminuting potato products to a pumpable liquid were compared: two CMLP processes (one using an Urschel Comitrol and a second using an HPH), a hot milled liquid potato process (i.e., a high-shearing with a shearing temperature rising above 67° C.), and a conventional low shear process. All four processes used the same formulation, which is outlined in TABLE 1, below.

TABLE 1

| Ingredient | Weight Percent |
|---|---|
| Innovator Potatoes (Diced) | 25 |
| Sunflower Oil | 10 |
| Water | 65 |

Example 1

CMLP Process (Urschel Comitrol)

Thawed diced ¾ potato cubes, which had been pre-blanched and treated with a citric acid chelating solution, were pre-milled with an Urschel Comitrol 1700 fitted with a Dio Cut impeller and a 3K 030 300U head at a rotational speed of 3600 rpm. This produced a coarsely granulated raw potato mash. The granulated potato mash was then mixed with the water and oil in the proportions indicated in TABLE 1.

The potato, water, and oil slurry was then milled at high shear by processing it in a single pass through an Urschel Comitrol 1700 fitted with a Veri Cut HD 73027 impeller and a 218084 head at a rotational speed of 9390 rpm. The inlet temperature was 18° C. and the exit temperature was 19° C. The resulting liquid potato cold-milled product was measured on a grind fineness gauge, which showed an average particle size of 75 μm with the largest size being 130 μm. These particle sizes were later confirmed by microscopy. The material was then stored under refrigeration.

Figure 2:
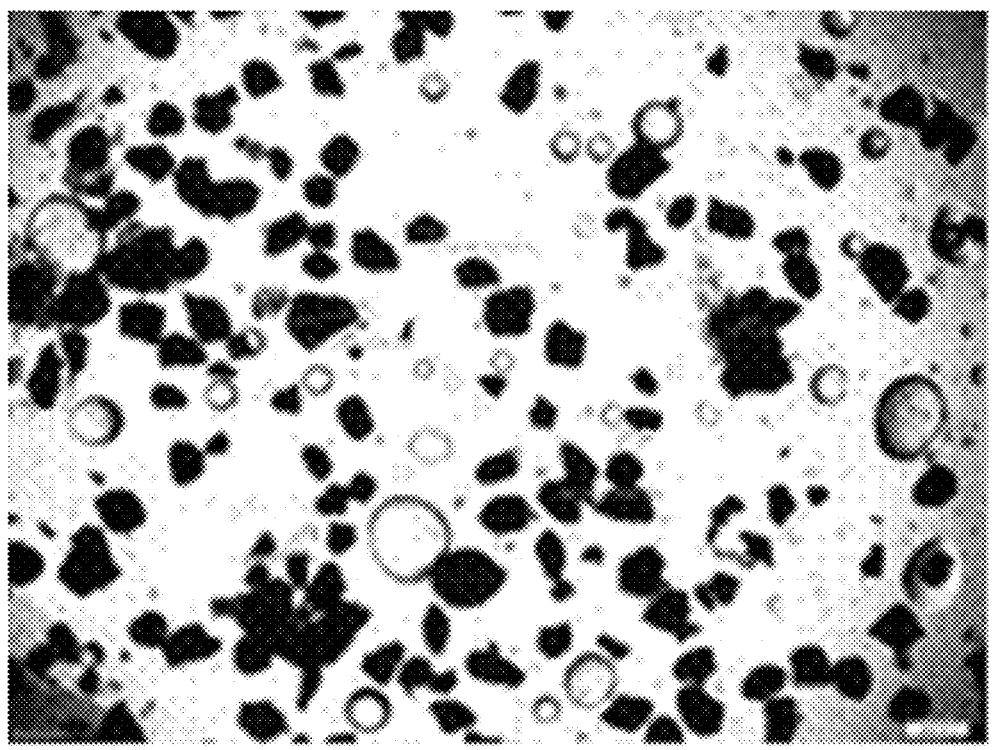
FIG. 2 depicts a microscope image taken from the sample produced in Example 1.

FIG. 2 depicts a microscope image taken using an Olympus BX53 compound microscope in Bright-field mode with an LED powered Kohler illuminator (un-polarized). Samples of the potato product were diluted with distilled water and stained with Lugol solution. Image capture and particle sizing was carried out with the associated Olympus cellScan software.

After 13 days in cold storage, the liquid potato cold-milled product was cooked to 70° C. and then allowed to cool to room temperature. A portion was then transferred to the rheometer sample chamber (Brookfield DV3TRVTJ with small sample adaptor kit using a SC4-28 spindle and TC-650 AP controller water bath), where it was placed in the temperature-controlled water bath (set at 12.5° C.). Subsequently, the rheometer spindle was positioned in the product.

Once the sample had reached a temperature of 12.5° C., the rheometer ran through a prescribed program. During this program, the spindle was spun at a defined rpm which, together with the wall-to-wall distance between the spindle and the chamber, created a defined shear rate in the sample. Consequently, the corresponding torque can be measured, which directly translated to the experienced shear stress (dynes/cm$^2$). The program stepped through a series of rotational speeds at 30 second intervals to create a shear rate range covering 0 to 67.2 1/s. Once the maximum shear rate of 67.2 1/s was reached, the program reduced the rotational speed of the spindle in 30 second intervals back down to zero. This resulted in two sets of data—one "up" and one "down." plotted together as one curve where any hysteresis effects are then noticeable.

Example 2

CMLP Process (High Pressure Homogenization (HPH))

Thawed diced ¾ potato cubes, which had been pre-blanched and treated with a citric acid chelating solution, were pre-milled with a Karl Schnell F-Series blender. This produced a coarsely granulated raw potato mash. The granulated potato mash was then mixed with the water and oil in the proportions indicated in TABLE 1.

The potato, water, and oil slurry was then milled at high shear by processing it in a single pass through a Tetra Laval High Pressure Homogenizer at a pressure of 1800 psig. The inlet temperature was 20° C. and the outlet temperature was 20° C. The resulting liquid potato cold-milled product was measured by microscopy, which showed an average particle size of 200 μm with a particle size range of 3 to 300 μm. The material was then stored under refrigeration.

Figure 3:
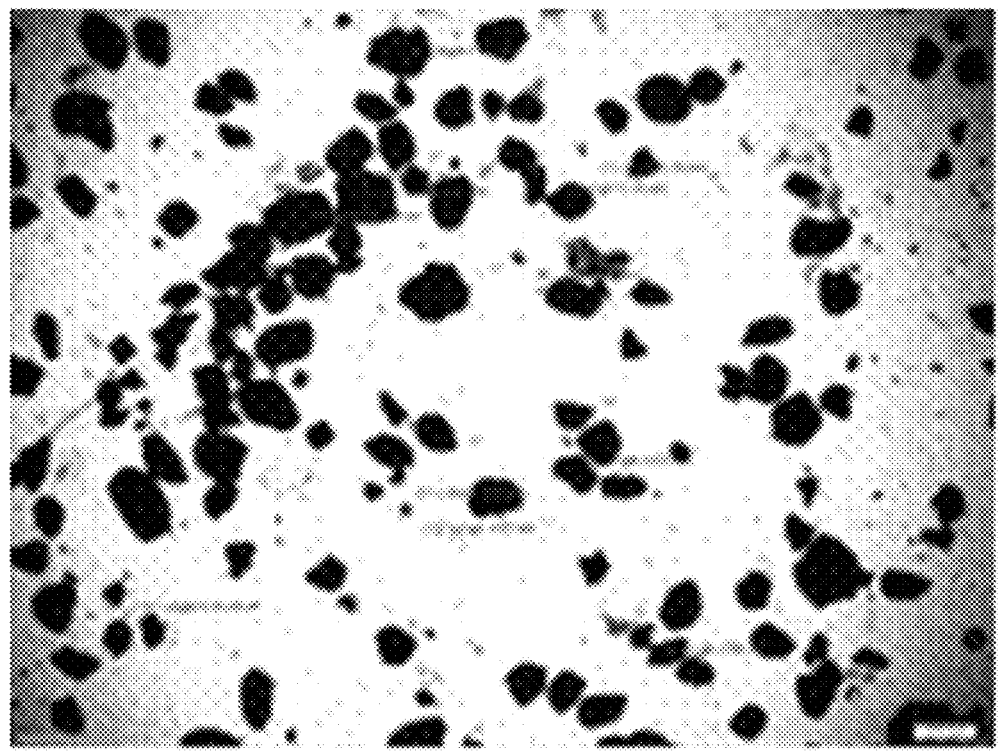
FIG. 3 depicts a microscope image taken from the sample produced in Example 2.

FIG. 3 depicts a microscope image taken using an Olympus BX53 compound microscope in Bright-field mode with an LED powered Kohler illuminator (un-polarized). Samples of the potato product were diluted with distilled water and stained with Lugol solution. Image capture and particle sizing was carried out with the associated Olympus cellScan software.

After five days the liquid potato cold-milled product was cooked to 70° C. and then allowed to cool to room temperature. A portion was then transferred to the rheometer sample chamber (Brookfield DV3TRVTJ with small sample adaptor kit using a SC4-28 spindle and TC-650 AP controller water bath), where it was placed in the temperature-controlled water bath (set at 12.5° C.). Subsequently, the rheometer spindle was positioned in the product.

Once the sample had reached a temperature of 12.5° C., the rheometer ran through a prescribed program. During this program, the spindle was spun at a defined rpm which, together with the wall-to-wall distance between the spindle and the chamber, created a defined shear rate in the sample. Consequently, the corresponding torque can be measured, which directly translated to the experienced shear stress (dynes/cm$^2$). The program stepped through a series of rotational speeds at 30 second intervals to create a shear rate range covering 0 to 67.2 1/s. Once the maximum shear rate of 67.2 1/s was reached, the program reduced the rotational speed of the spindle in 30 second intervals back down to zero. This resulted in two sets of data—one "up" and one "down." plotted together as one curve where any hysteresis effects are then noticeable.

TABLE 2, below, provides the Day 0, Day 1, and Day 2 rheological profiles of the tested sample.

TABLE 2

| Step | Shear Rate (1/s) | Liquid P Day 0 at 12.5° C. | Liquid P Day 1 at 12.5° C. | Liquid P Day 2 at 12.5° C. |
| --- | --- | --- | --- | --- |
| 1 | 0 | 0 | 0 | 0 |
| 2 | 0 | 105 | 64.4 | 54.6 |
| 3 | 0.28 | 200.2 | 198.8 | 109.2 |
| 4 | 0.7 | 245 | 249.2 | 137.2 |
| 5 | 1.4 | 271.6 | 295.4 | 163.8 |
| 6 | 2.8 | 313.6 | 324.8 | 175 |
| 7 | 5.6 | 383.6 | 336 | 179.2 |
| 8 | 11.2 | 488.6 | 343 | 186.2 |
| 9 | 22.4 | 649.6 | 387.8 | 215.6 |
| 10 | 33.6 | 744.8 | 435.4 | 231 |
| 11 | 44.8 | 831.6 | 441 | 242.2 |
| 12 | 56 | 931 | 466.2 | 250.6 |
| 13 | 67.2 | 1098 | 453.6 | 259 |
| 14 | 0 | 0 | 0 | 0 |
| 15 | 56 | 907.2 | 415.8 | 235.2 |
| 16 | 44.8 | 786.8 | 357 | 204.4 |
| 17 | 33.6 | 666.4 | 294 | 175 |
| 18 | 22.4 | 537.6 | 242.2 | 147 |
| 19 | 11.2 | 366.8 | 201.6 | 110.6 |
| 20 | 5.6 | 275.8 | 184.8 | 92.4 |
| 21 | 2.8 | 224 | 172.2 | 79.8 |
| 22 | 1.4 | 187.6 | 159.6 | 64.4 |
| 23 | 0.7 | 169.4 | 141.4 | 54.6 |
| 24 | 0.28 | 151.2 | 105 | 37.8 |

Figure 4:
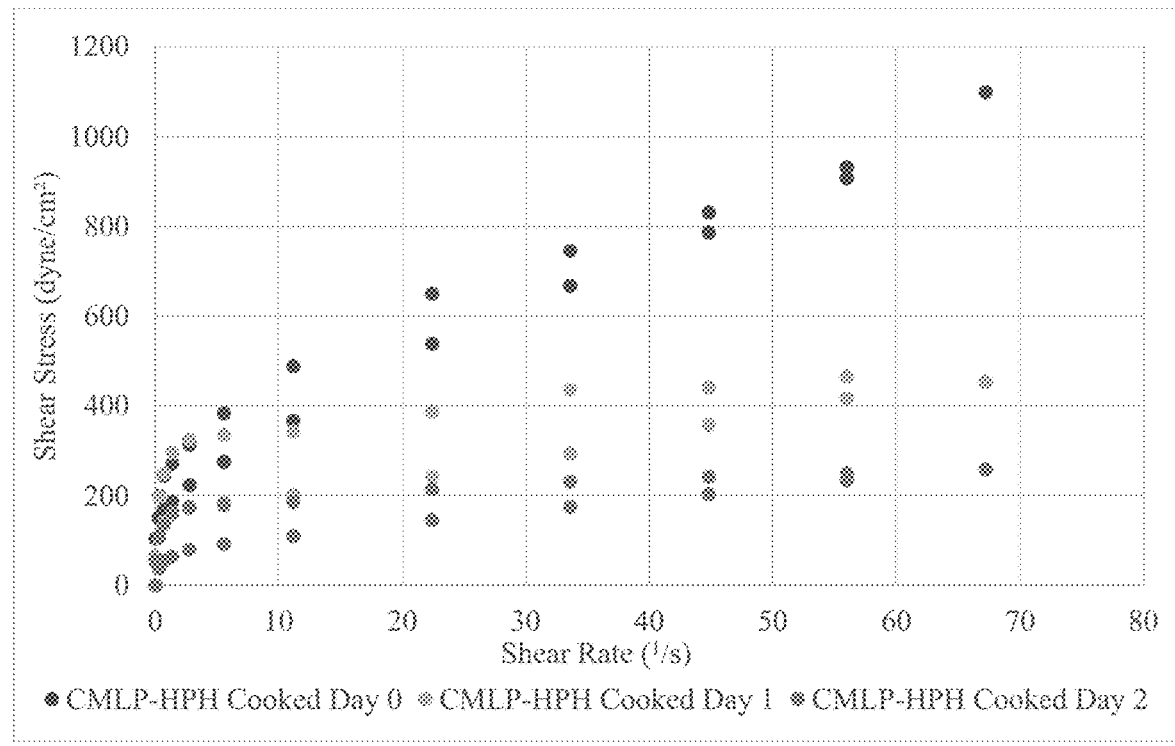
FIG. 4 is a chart showing the rheological properties of the sample from Example 2 at Day 0, Day 1, and Day 2.

FIG. 4 provides a chart showing the rheological properties of the tested sample at Day 0, Day 1, and Day 2.

Comparative Examples 3 and 4

Hot-Milled Liquid Potato Product and Low-Shear Potato Product

Thawed diced ¾ potato cubes, which had been pre-blanched and treated with a citric acid chelating solution, were mixed with the oil and water according to the recipe in TABLE 1 and poured into a Vitamix mixer (Vitamix 5200 model VM0103 11.5 amp 110 v with variable speed). It was at this point that the conventional low-shear method and the hot-milled liquid potato process described herein began to differ.

For the conventional method, the Vitamix was ran at a low speed setting (3-4 on dial) for 2 to 3 minutes until a consistent, homogeneous puree was achieved. The shear treatment was gentle enough to ensure that there was no appreciable temperature increase. The product was then heated in the microwave with stirring to achieve a temperature of 165 to 170° F. (74 to 77° C.).

For the Hot-milled Liquid Potato process, the Vitamix was run at a high speed setting (10 on dial) for 5 to 10 minutes until there was a characteristic appearance change where the product became glossy with a distinct sheen and the power draw for the motor noticeably rose. With the amount of mechanical work being applied to the product there was a temperature increase to around 170 to 180° F. (77 to 82° C.) by the end of the shear treatment.

For both methods, the finished product was allowed to stand for 30 minutes at room temperature and a portion was then transferred to the rheometer sample chamber (Brookfield DV3TRVTJ with small sample adaptor kit using a SC4-28 spindle and TC-650 AP controller water bath), where it was placed in the temperature-controlled water bath (set at 12.5° C.). Subsequently, the rheometer spindle was positioned in the product. This represented the "Day 0" product.

Once the sample had reached a temperature of 12.5° C., the rheometer ran through a prescribed program. During this program, the spindle was spun at a defined rpm which, together with the wall-to-wall distance between the spindle and the chamber, created a defined shear rate in the sample. Consequently, the corresponding torque can be measured, which directly translated to the experienced shear stress (dynes/cm$^2$). The program stepped through a series of rotational speeds at 30 second intervals to create a shear rate range covering 0 to 67.2 1/s. Once the maximum shear rate of 67.2 1/s was reached, the program reduced the rotational speed of the spindle in 30 second intervals back down to zero. Thus, this resulted in two sets of data—one "up" and one "down." plotted together as one curve where any hysteresis effects are then noticeable.

TABLE 3, below, provides the Day 0 rheological profiles at 12.5° C. of the samples from Examples 1-4.

TABLE 3

| Step | Shear Rate (1/s) | Example 1 | Example 2 | Comparative Example 3 (Hot-Milled) | Comparative Example 4 (Conventional) |
|---|---|---|---|---|---|
| 1 | 0 | 0 | 0 | 0 | 0 |
| 2 | 0 | 42 | 105 | 4.2 | 2.8 |
| 3 | 0.28 | 137.2 | 200.2 | 19.6 | 7 |
| 4 | 0.7 | 183.4 | 245 | 26.6 | 9.8 |
| 5 | 1.4 | 218.4 | 271.6 | 35 | 11.2 |
| 6 | 2.8 | 247.8 | 313.6 | 46.2 | 18.2 |
| 7 | 5.6 | 313.6 | 383.6 | 61.6 | 33.6 |
| 8 | 11.2 | 428.4 | 488.6 | 86.8 | 46.2 |
| 9 | 22.4 | 575.4 | 649.6 | 127.4 | 64.4 |
| 10 | 33.6 | 716.8 | 744.8 | 159.6 | 78.4 |
| 11 | 44.8 | 847 | 831.6 | 187.6 | 89.6 |
| 12 | 56 | 968.8 | 931 | 212.8 | 99.4 |
| 13 | 67.2 | 1007 | 1098 | 235.2 | 109.2 |
| 14 | 0 | 0 | 0 | 0 | 0 |
| 15 | 56 | 905.8 | 907.2 | 207.2 | 98 |
| 16 | 44.8 | 833 | 786.8 | 177.8 | 84 |
| 17 | 33.6 | 744.8 | 666.4 | 147 | 70 |
| 18 | 22.4 | 606.2 | 537.6 | 113.4 | 54.6 |
| 19 | 11.2 | 415.8 | 366.8 | 74.2 | 36.4 |
| 20 | 5.6 | 299.6 | 275.8 | 49 | 25.2 |
| 21 | 2.8 | 221.2 | 224 | 35 | 16.8 |
| 22 | 1.4 | 175 | 187.6 | 25.2 | 12.6 |
| 23 | 0.7 | 148.4 | 169.4 | 21 | 8.4 |
| 24 | 0.28 | 124.6 | 151.2 | 15.4 | 8.4 |

Figure 5:
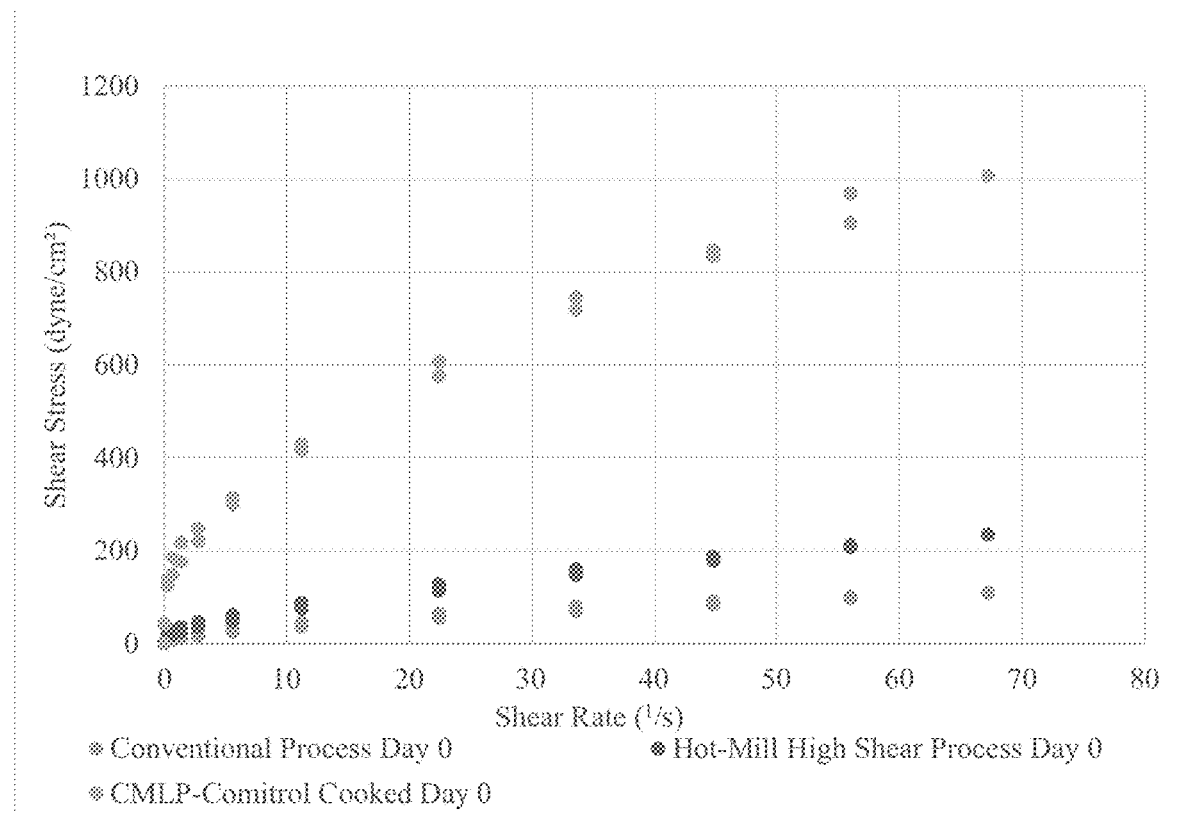
FIG. 5 is a graph that compares the rheological profiles at Day 0 of the liquid potato product produced in Example 1 with the hot-milled product and conventional products produced in Comparative Examples 3 and 4.

Furthermore, it is possible to directly compare the rheology of the products at Day 0 from each of the four methods with a curve plot of shear rate (1/s) against shear stress (dynes/cm$^2$). FIG. 5 is a graph that compares the rheological profiles at Day 0 of the liquid potato product produced in Example 1 with the hot-milled product and conventional products produced in Comparative Examples 3 and 4.

Figure 6:
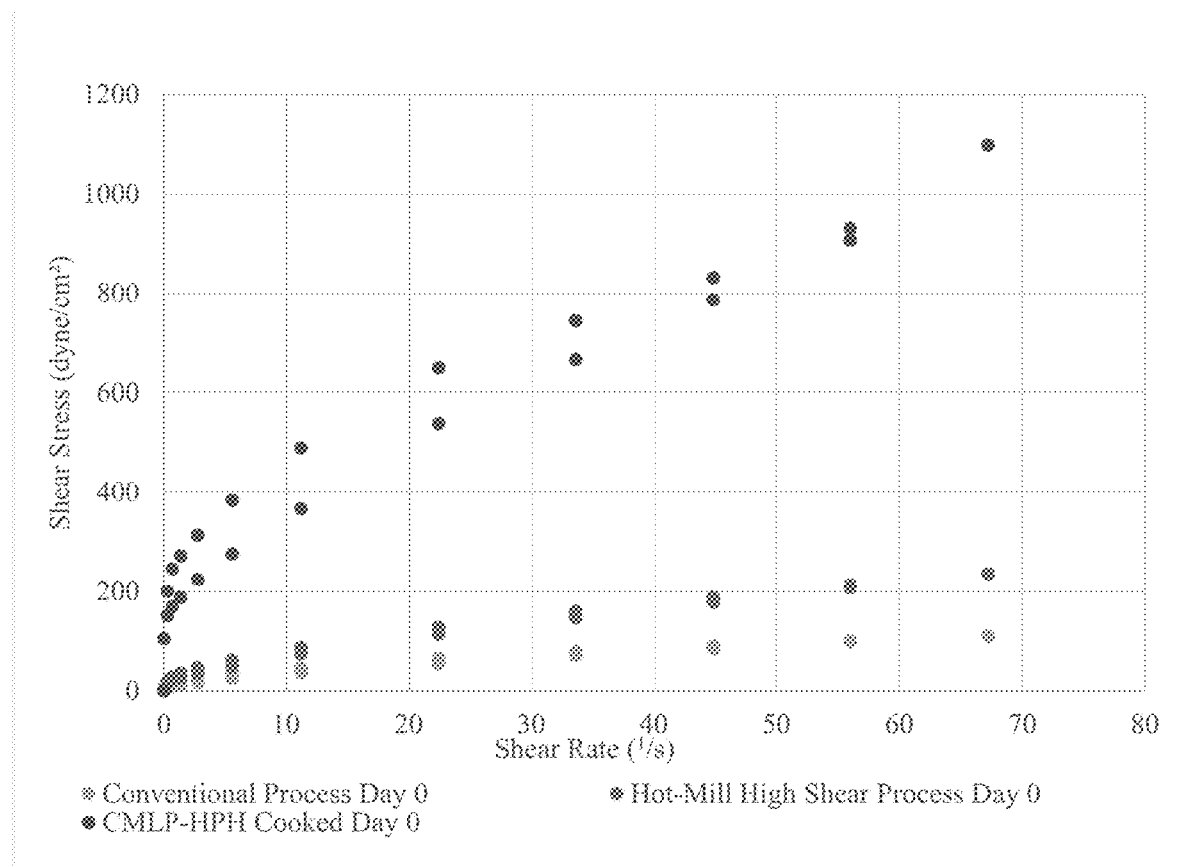
FIG. 6 is a graph that compares the rheological profiles at Day 0 of the liquid potato product produced in Example 2 with the hot-milled product and conventional products produced in Comparative Examples 3 and 4.

FIG. 6 is a graph that compares the rheological profiles at Day 0 of the liquid potato product produced in Example 2 with the hot-milled product and conventional products produced in Comparative Examples 3 and 4.

As shown in FIGS. 5 and 6, both of the cold-milled products produced in Examples 1 and 2 are substantially thicker (more viscous) than both the hot-milled product and conventional product of Comparative Examples 3 and 4.

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

NUMERICAL RANGES

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of making a food product, the method consisting essentially of:
   (a) providing an initial potato feed comprising a potato component having an initial moisture content;
   (b) at least partially gelatinizing said initial potato feed to thereby form a gelatinous potato feed;
   (c) shearing at least a portion of said gelatinous potato feed at a temperature of less than 67° C. to thereby form a sheared potato product comprising an average particle size on a volume basis in the range of 50 to 300 µm as measured by a Microtrac Bluewave Particle Size Analyser;
   (d) heating said sheared potato product to at least 55° C. to thereby form a liquid potato product exhibiting a non-Newtonian fluid rheological profile; and
   (e) forming said food product comprising a liquid component or a semi-solid component,
      wherein said liquid component or said semi-solid component comprises said liquid potato product,
      wherein said food product comprises a dip, a sauce, a dressing, a soup, an imitation dairy product, a spread, a beverage, or a confectionary.

2. The method according to claim 1, wherein said shearing occurs at a temperature of less than 55° C. and a pressure of less than 3,000 psig.

3. The method according to claim 1, wherein said sheared potato product comprises a D90 particle size on a volume basis of between 120 to 300 µm, as measured by a Microtrac Bluewave Particle Size Analyser.

4. The method according to claim 1, wherein said heating heats said sheared potato product to at least 67° C.

5. The method according to claim 1, further comprising adding water and/or at least one oil to said initial potato feed prior to said shearing.

6. The method according to claim 1, wherein said liquid potato product exhibits two or more of the following rheological properties as measured at 12.5° C.:
   i. $Y_{1-5} \neq Y_{5-10} \neq Y_{10-15} \neq Y_{15-20}$;
   ii. $Y_{10}$ is at least 50 percent greater than $Y_{10-15}$ and/or $Y_{15-20}$;
   iii. $Y_{1-5}$ is at least 50 percent greater than $Y_{5-10}$, $Y_{10-15}$, and/or $Y_{15-20}$; and
   iv. $Y_{5-10}$ is at least 50 percent greater than $Y_{10-15}$ and/or $Y_{15-20}$,
   wherein "Y" is shear stress in dynes per centimeter squared (dynes/cm$^2$) and subscript values used with "Y" are shear rates or shear rate ranges per second (1/s) at which the shear stress "Y" is measured,
   wherein said rheological properties are measured 30 minutes after forming said liquid potato product.

7. The method according to claim 1, wherein said liquid potato product exhibits one of the following shear stress profiles at 12.5° C. measured 30 minutes after forming said liquid potato product:
   i. a shear stress of at least 15 dynes/cm$^2$ at a shear rate of 5 1/s, a shear stress of at least 25 dynes/cm$^2$ at a shear rate of 10 1/s, a shear stress of at least 35 dynes/cm$^2$ at a shear rate of 15 1/s, and/or a shear stress of at least 40 dynes/cm$^2$ at a shear rate of 20 1/s, when said liquid potato product comprises less than 10 weight percent of at least one complex carbohydrate material, other than said potato component; or
   ii. a shear stress of at least 150 dynes/cm$^2$ at a shear rate of 5 1/s, a shear stress of at least 200 dynes/cm$^2$ at a shear rate of 10 1/s, a shear stress of at least 225 dynes/cm$^2$ at a shear rate of 15 1/s, and/or a shear stress of at least 250 dynes/cm$^2$ at a shear rate of 20 1/s, when said liquid potato product comprises at least 10 weight percent of at least one complex carbohydrate material, other than said potato component.

8. The method according to claim 1, further comprising pre-milling said gelatinous potato feed in a cutting device prior to said shearing of step (c).

9. The method according to claim 1, wherein said sheared potato product comprises a D90 particle size of 75 to 300 µm.

10. The method according to claim 1, wherein said liquid potato product comprises 10 to 75 weight percent of added water, wherein said added water is water added before or during said shearing of step (c).

11. A method of making a food product, the method consisting essentially of:
   (a) providing an initial potato feed comprising a potato component having an initial moisture content;
   (b) optionally pretreating said initial potato feed with one or more pretreatment techniques to form a pretreated potato feed, wherein said pretreatment techniques comprise washing, peeling, mashing, heating, cubing, dicing, blanching, or a combination thereof;
   (c) at least partially gelatinizing said initial potato feed or said pretreated potato feed to thereby form a gelatinous potato feed;
   (d) optionally chelating said initial potato feed or said gelatinous potato feed to form a chelated potato feed;
   (e) optionally freezing said pretreated potato feed, said gelatinous potato feed, or said chelated potato feed to form a frozen potato feed and thawing said frozen potato feed to form a thawed potato feed;
   (f) optionally pre-milling said initial potato feed, said pretreated potato feed, said gelatinous potato feed, said chelated potato feed, or said thawed potato feed to form a pre-milled potato feed;
   (g) optionally adding one or more components to said initial potato feed, said pretreated potato feed, said gelatinous potato feed, said chelated potato feed, said pre-milled potato feed, or said thawed potato feed;
   (h) shearing at least a portion of said gelatinous potato feed, said chelated potato feed, said pre-milled potato feed, or thawed potato feed in the presence of at least one oil at a temperature of less than 67° C. to thereby form a sheared potato product comprising an average particle size on a volume basis in the range of 50 to 300 µm as measured by a Microtrac Bluewave Particle Size Analyser;
   (i) optionally adding one or more ingredients to said sheared potato product;

(j) heating said sheared potato product to at least 55° C. to thereby form a liquid potato product exhibiting a non-Newtonian fluid rheological profile, wherein said heating occurs at a temperature in the range 55 to 100° C., wherein said liquid potato product comprises at least 5 weight percent of said oil; and (k) forming said food product comprising at least 50 weight percent of said liquid potato product from step (j), wherein said food product comprises a dip, a sauce, a dressing, a soup, an imitation dairy product, a spread, a beverage, or a confectionary.

12. The method according to claim 11, wherein said sheared potato product comprises a D90 particle size of 75 to 300 μm.

13. The method according to claim 11, wherein said liquid potato product comprises 10 to 75 weight percent of added water, wherein said added water is water added before or during said shearing of step (h).

14. A method of making a food product, the method comprising:

(a) providing an initial potato feed comprising a potato component having an initial moisture content;

(b) at least partially gelatinizing said initial potato feed to thereby form a gelatinous potato feed;

(c) shearing at least a portion of said gelatinous potato feed in the presence of at least one oil at a temperature of less than 67° C. to thereby form a sheared potato product comprising an average particle size on a volume basis in the range of 50 to 300 μm as measured by a Microtrac Bluewave Particle Size Analyser;

(d) heating said sheared potato product to at least 55° C. to thereby form a liquid potato product exhibiting a non-Newtonian fluid rheological profile, wherein said heating occurs at a temperature in the range 55 to 100° C., wherein said liquid potato product comprises at least 5 weight percent of said oil; and (e) forming said food product comprising at least 50 weight percent of said liquid potato product, wherein said food product comprises a dip, a sauce, a dressing, a soup, an imitation dairy product, a spread, a beverage, or a confectionary.

15. The method according to claim 14, wherein said sheared potato product comprises a D90 particle size of 75 to 300 μm.

16. The method according to claim 14, wherein said liquid potato product comprises 10 to 75 weight percent of added water, wherein said added water is water added before or during said shearing of step (c).

17. A method of making a food product, the method consisting essentially of:

(a) providing an initial potato feed comprising a potato component having an initial moisture content;

(b) optionally pretreating said initial potato feed with one or more pretreatment techniques to form a pretreated potato feed, wherein said pretreatment techniques comprise washing, peeling, mashing, heating, cubing, dicing, blanching, or a combination thereof;

(c) at least partially gelatinizing said initial potato feed or said pretreated potato feed to thereby form a gelatinous potato feed;

(d) optionally chelating said initial potato feed or said gelatinous potato feed to form a chelated potato feed;

(e) optionally freezing said pretreated potato feed, said gelatinous potato feed, or said chelated potato feed to form a frozen potato feed and thawing said frozen potato feed to form a thawed potato feed;

(f) optionally pre-milling said initial potato feed, said pretreated potato feed, said gelatinous potato feed, said chelated potato feed, or said thawed potato feed to form a pre-milled potato feed;

(g) optionally adding one or more components to said initial potato feed, said pretreated potato feed, said gelatinous potato feed, said chelated potato feed, said pre-milled potato feed, or said thawed potato feed;

(h) shearing at least a portion of said gelatinous potato feed, said chelated potato feed, said pre-milled potato feed, or thawed potato feed at a temperature of less than 67° C. to thereby form a sheared potato product comprising an average particle size on a volume basis in the range of 50 to 300 μm as measured by a Microtrac Bluewave Particle Size Analyser;

(i) optionally adding one or more ingredients to said sheared potato product;

(j) heating said sheared potato product to at least 55° C. to thereby form a liquid potato product exhibiting a non-Newtonian fluid rheological profile, wherein said heating occurs at a temperature in the range 55 to 100° C. and (k) forming said food product comprising at least 50 weight percent of said liquid potato product from step (j), wherein said food product comprises a dip, a sauce, a dressing, a soup, an imitation dairy product, a spread, a beverage, or a confectionary.

18. The method according to claim 17, wherein said sheared potato product comprises a D90 particle size of 75 to 300 μm.

19. The method according to claim 17, wherein said liquid potato product comprises 10 to 75 weight percent of added water, wherein said added water is water added before or during said shearing of step (h).

* * * * *